(12) United States Patent
Kobayashi et al.

(10) Patent No.: US 8,428,520 B2
(45) Date of Patent: Apr. 23, 2013

(54) MARGIN DESIGN APPARATUS, MARGIN DESIGN SYSTEM, MARGIN DESIGN METHOD, AND PROGRAM

(75) Inventors: Kosei Kobayashi, Tokyo (JP); Yasuhiko Matsunaga, Tokyo (JP); Yoshinori Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 259 days.

(21) Appl. No.: 12/922,795

(22) PCT Filed: Mar. 18, 2009

(86) PCT No.: PCT/JP2009/055230
§ 371 (c)(1),
(2), (4) Date: Sep. 15, 2010

(87) PCT Pub. No.: WO2009/119393
PCT Pub. Date: Oct. 1, 2009

(65) Prior Publication Data
US 2011/0021156 A1 Jan. 27, 2011

(30) Foreign Application Priority Data
Mar. 24, 2008 (JP) ................................. 2008-074881

(51) Int. Cl.
*H04B 17/00* (2006.01)
(52) U.S. Cl.
USPC ................ 455/67.13; 455/422.1; 455/423; 370/241

(58) Field of Classification Search .............. 455/67.13, 455/422.1, 423, 425, 446, 450, 456.1; 370/241
See application file for complete search history.

(56) References Cited

U.S. PATENT DOCUMENTS
2008/0014976 A1 * 1/2008 Fujita et al. ................... 455/513

FOREIGN PATENT DOCUMENTS

| EP | 1 562 316 | * | 8/2005 |
| JP | 8-322079 A | | 12/1996 |
| JP | 2000341204 A | | 12/2000 |
| JP | 2002016556 A | | 1/2002 |
| JP | 2002271833 A | | 9/2002 |
| JP | 2005223732 A | | 8/2005 |
| JP | 2006303788 A | | 11/2006 |

OTHER PUBLICATIONS

International Search Report for PCT/JP2009/055230 mailed May 12, 2009.

* cited by examiner

*Primary Examiner* — Tuan H Nguyen (57) ABSTRACT

Provided is a technique of calculating a proper margin according to the area or a radio propagation estimation method in the area design of wireless communication using a radio propagation simulator. From a storage part wherein information relating to positions where deterioration of a communication quality or a radio quality is confirmed and information relating to the radio conditions at the positions are associated with each other, a margin design system extracts positions where the radio conditions are equal, estimates the radio quality at the positions by the radio propagation simulator, and calculates the margin of a radio quality estimated value on the basis of the estimated radio quality.

18 Claims, 8 Drawing Sheets

| DATE | TIME | INFORMATION OF LOCATION | INDOOR/ OUTDOOR (CATEGORY) | RADIO WAVE CONDITION | CONTENTS OF QUALITY DETERIORATION |
|---|---|---|---|---|---|
| YYYY MM DD | hh mm | EAST LONGITUDE X, NORTH LATITUDE Y | INDOOR | OUT OF SERVICE | SENDING IMPOSSIBLE |
| YYYY MM DD | hh mm | EAST LONGITUDE X, NORTH LATITUDE Y | OUTDOOR | 1 ANTENNA | THROUGHPUT DETERIORATION |
| YYYY MM DD | hh mm | EAST LONGITUDE X, NORTH LATITUDE Y | OUTDOOR | OUT OF SERVICE | CUT-OUT IN CONVERSATION |
| YYYY MM DD | hh mm | EAST LONGITUDE X, NORTH LATITUDE Y | INDOOR | 3 ANTENNAS | ONE-WAY CONVERSATION |

MARGIN DESIGN APPARATUS, MARGIN DESIGN SYSTEM, MARGIN DESIGN METHOD, AND PROGRAM

The present application is the National Phase of PCT/JP2009/055230, filed Mar. 18, 2009, which claims the priority right based on Japanese Patent application No.2008-074881 filed on Mar. 24, 2008 and the entire of the disclosure is incorporated here.

TECHNICAL FIELD

The present invention relates to a margin design apparatus, a margin design system, a margin design method and program in the area design of wireless communication, especially a margin design apparatus, a margin design system, a margin design method and program which can be applied in case that the area design of cellular wireless communication is carried out using a radio wave propagation simulator.

BACKGROUND ART

In a cellular wireless communication system, a service area is divided into no less than two cells and a radio base station is installed in each cell to realize the wireless communication. It is necessary in order to secure an enough high quality of communication in the service area to carry out properly a layout of base stations and an adjustment of wireless parameters such as directions of antennas, tilt angles of antennas and antenna powers considering surroundings such as geographical features, a building distribution, and a user distribution. A radio wave propagation simulator is applied in general as a means to support the area design.

A radio wave propagation simulator estimates a plane distribution condition of radio wave quality such as a Received Signal Code Power (RSCP) and a ratio of energy per chip of a desired wave to in-band received power density (Ec/N0) based on a base station information (location of the base station and wireless parameters), a map information, a building information and so on, around the area of design target area. As typical techniques for the radio wave propagation estimation, the following techniques are well known; statistical techniques such as the Hata/Okumura model in which a propagation curve showing radio wave propagation characteristics is statistically modeled based on actual measured data of radio wave quality, and the ray tracing method in which radio wave propagation characteristics are predicted in a determinism way by geometric optics techniques.

Several technical methods are proposed in order to improve accuracy of radio wave propagation estimation because the difference between an estimated radio wave quality and an actual radio wave quality is an important problem in the area design using a radio wave propagation simulator.

For example, a method (refer to patent document 1) to revise the above mentioned propagation curve used in a statistical technique based on an actually measured radio wave quality (actual measured data) in the area, and a method (refer to patent document 2) to estimate a radio wave building penetrating loss which causes errors in radio wave propagation estimation based on land utilization data and data of the number of households are given. As a method to get an actual measured data of radio wave quality, such a technology is also proposed as to acquire location information where communication quality deterioration occurred and quality deterioration information with applying mobile terminals actually used by users (refer to patent document 3).

Patent document 1: Japanese patent Laid-open publication No. 2005-223732 (Japanese patent No. 3862021)
Patent document 2: Japanese patent Laid-open publication No. 2002-016556 (Japanese patent No. 3403701)
Patent document 3: Japanese patent Laid-open publication No. 2002-271833

DISCLOSER OF THE INVENTION

Problems to be Solved by the Invention

However, though a purpose of any of these technologies is to improve the accuracy of radio wave propagation estimation, it is usually not clear how big errors are included in the given results of estimated value of radio wave quality (radio wave quality estimation value).

For example, it is essential for the method which revises the radio wave quality estimation value with applying an actual measured data, as mentioned in patent document 1, to acquire a sufficient and impartial actual measured data from the area. However, it is a problem that the revision is effective only in a limited area and errors still remains in other places because usually there are places where measuring itself is difficult, such as buildings and ordinary houses. Moreover, such a method has been not released yet as to revise a radio wave propagation estimation with applying the location information where quality deterioration occurred, while as above mentioned, in patent document 3, such a technology was proposed as to acquire the location information where communication quality deterioration occurred and the quality deterioration information with applying mobile terminals which are actually used by users.

On the other hand, the method as mentioned in patent document 2 to estimate such as building penetrating loss from geographic data may cause big errors depending on the characteristics of the locations such as shapes and materials of structures because the model itself is based on the experience.

As details mentioned above, in case of the area design applying a radio wave propagation simulator, under considering errors of radio wave propagation estimation, the area design is usually carried out after estimating a fixed margin (for example, 10 to 20 dB approximately) concerning to the estimated radio wave quality.

However, actually bigger errors often occur than above mentioned fixed margin, because the accuracy of radio wave propagation estimation varies depending on the characteristics of the design target area such as geographic condition and building distributions, for example, the building penetrating loss effects in the city area where buildings are concentrated more than an estimation. Moreover, because degree of the errors also depends on the techniques of radio wave propagation estimation, in the area design with applying a radio wave propagation simulator, it is quite difficult to carry out the area design after estimating a proper margin in the target area.

Therefore the aims of the present invention for solving the above mentioned problems is in the area design with applying a radio wave propagation simulator to provide a margin design technology which calculates a proper margin according to an area and radio wave propagation estimation technique and can carry out an area design with applying a calculated margin.

Means to Solve the Problem

The present invention for solving the above mentioned problems is a margin design apparatus, characterized in comprising a storage for recording the information about locations where the deterioration of communication quality or radio wave quality has been confirmed in relation with the information about radio wave condition at the location, an estimating means for estimating a radio wave quality at the location which is picked up as the location which has the same radio wave condition from said storage wherein information relating to location where deterioration of communication quality or radio wave quality is confirmed, with a radio wave propagation simulator, and a margin calculating means for calculating a margin of radio wave quality estimation value based on the above mentioned estimated radio wave quality and revising a radio wave quality distribution of the design target area based on the margin.

The present invention for solving the above mentioned problems is a margin design system, characterized in comprising a storage for recording the information about the locations where the deterioration of communication quality or radio wave quality has been confirmed in relation with the information about the radio wave condition at the location, an estimating means for estimating a radio wave quality at the location which is picked up as the location which has the same radio wave condition from said storage wherein information relating to location where deterioration of communication quality or radio wave quality is confirmed, with a radio wave propagation simulator, and a margin calculating means for calculating a margin of radio wave quality estimation value based on the above mentioned estimated radio wave quality and revising a radio wave quality distribution of a design target area based on the margin.

The present invention for solving the above mentioned problems is a margin design method, characterized in comprising an estimating step of estimating a radio wave quality at the location which is picked up as the location which has the same radio wave condition from a storage wherein information relating to location where deterioration of communication quality or radio wave quality is confirmed and information relating to the radio wave condition at said location are associated with each other, with a radio wave propagation simulator, and a margin calculating step of calculating a margin of radio wave quality estimation value based on the above mentioned estimated radio wave quality.

The present invention for solving the above mentioned problems is a program for a margin design apparatus, characterized in that said program makes said margin design apparatus execute: an estimating processing of estimating a radio wave quality at the location which is picked up as the location which has the same radio wave condition from a storage wherein information relating to location where deterioration of communication quality or radio wave quality is confirmed and information relating to the radio wave condition at said location are associated with each other, with a radio wave propagation simulator, and a margin calculating processing of calculating a margin of radio wave quality estimation value based on the above mentioned estimated radio wave quality.

Effects of the Invention

In the present invention, a margin in case of the area design with applying a radio wave propagation simulator is calculated with applying information of locations where the deterioration of communication quality or radio wave quality has been confirmed and the information of radio wave condition at the location. Therefore, it is not necessary to acquire information about areas where communication quality and radio wave quality are good in case of calculating a margin for radio wave propagation estimation. And the present invention makes it possible to calculate a margin statistically meeting the area and radio wave propagation estimation techniques.

EXPLANATION OF SYMBOLS

10: margin design apparatus
101: radio wave propagation estimating unit
102: storage for quality deteriorating location information
103: margin calculating unit
104: display controlling unit
105: area design directing unit

BEST MODE FOR EXECUTING THE PRESENT INVENTION

The first embodiment to execute the present invention is explained in detail by referring to several diagrams.

A configuration example of the first embodiment is explained.

Figure 1:
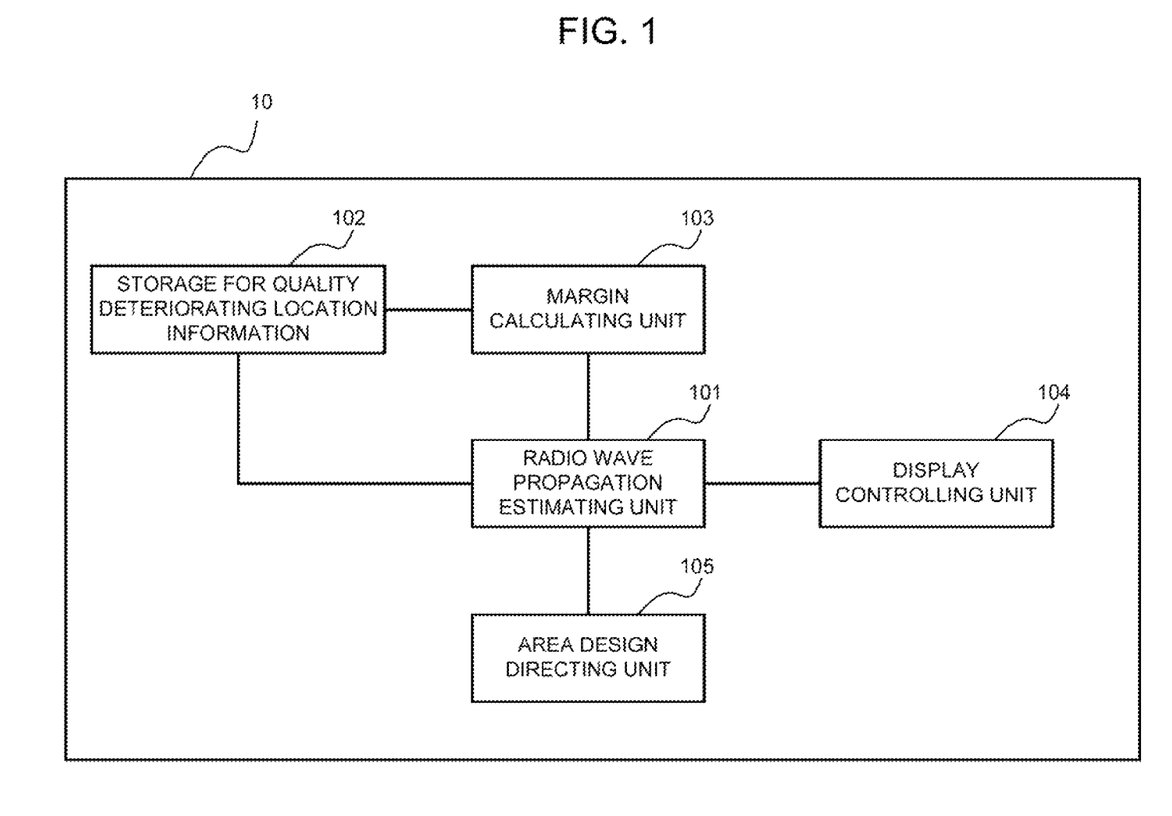
FIG. 1 is a configuration diagram of a margin design apparatus in the first embodiment.

FIG. 1 is a block diagram illustrating a whole configuration of a margin design apparatus in the first embodiment.

In FIG. 1, a margin design apparatus 10 is comprised of a radio wave propagation estimating unit 101, a storage for quality deteriorating location information 102, a margin calculating unit 103, a display controlling unit 104 and an area design directing unit 105.

The radio wave propagation estimating unit 101 executes a radio wave propagation estimation in a design target area based on such information as a base station information, a map information, a building information and so on which are stored in it. The estimated information includes the radio wave quality such as a Received Signal Code Power (RSCP) and a ratio of energy per chip of a desired wave to in-band received power density (Ec/NO) for each base station at an optional location in the target area. The results of radio wave estimation can be stored in some storage inside or outside of the radio wave propagation estimating unit 101. Any of the above mentioned statistic techniques and the ray tracing methods can be applied as a radio wave propagation estimating technique. The detail explanation of the radio wave propagation estimating unit 101 is omitted because the concrete configuration of it is known well as a radio wave propagation simulator by the traders concerned and any of them can be applied in the present invention.

Figure 2:
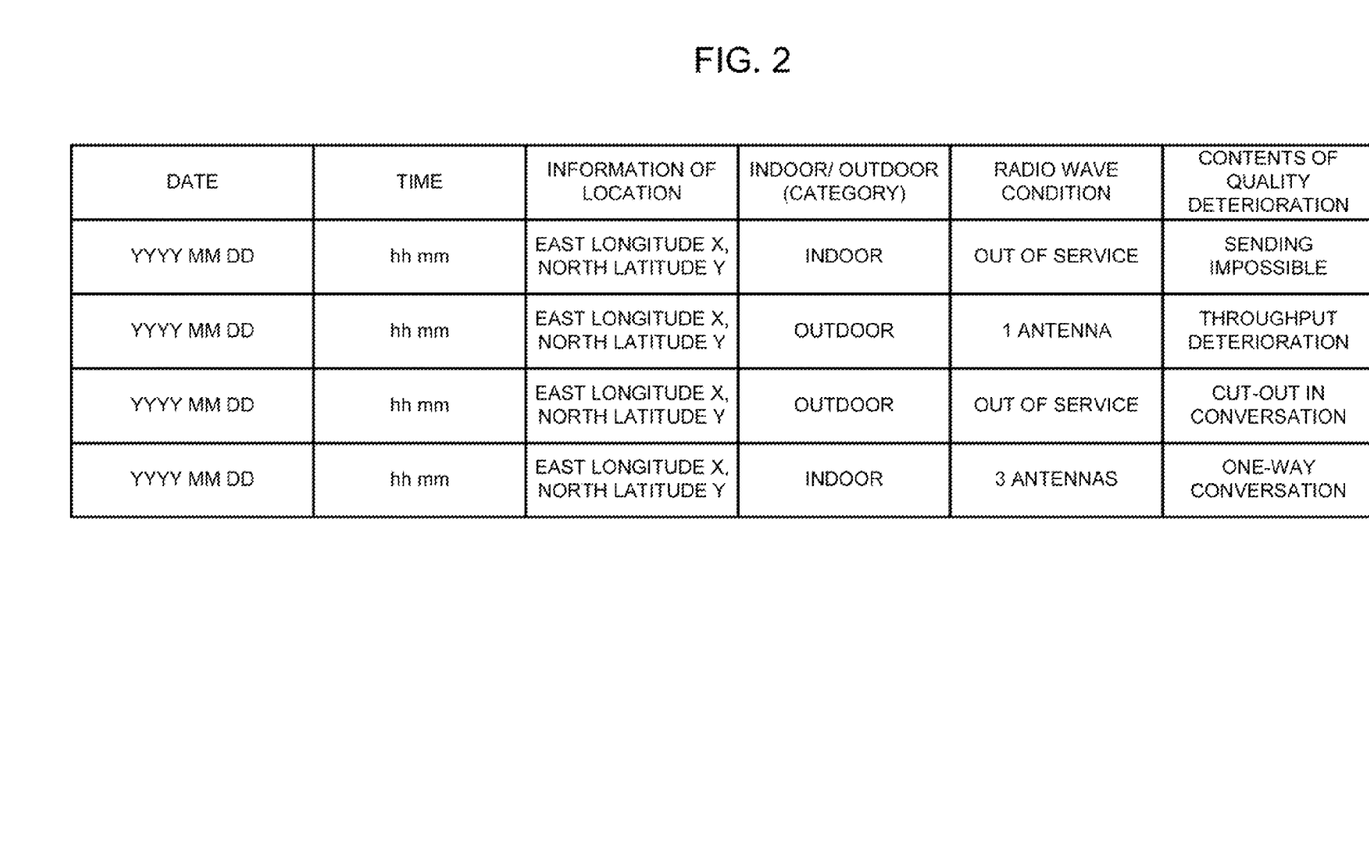
FIG. 2 is an explanation diagram illustrating an example of stored information in a storage for quality deteriorating location information.

The storage for quality deteriorating location information 102 records information of locations where deterioration of communication quality or radio wave quality has been confirmed by ordinary mobile terminals such as mobile phones. For example, it records such information as one about the location (the location of the out of service) which has been judged as the outside of the service (out of service) of wireless communication. Usually with a mobile terminal it can be checked whether out of service or not, and in case of a mobile phone, a symbol indicating "out of service" is shown on a display. The information on quality deterioration locations, for example, is acquired in such a way as user's complaints applied by wireless communication users to communication enterprises and also can be automatically acquired with integrating special software additionally on mobile terminals installed with positioning function such as GPS. FIG. 2 is illustrating an example of information stored in the storage for quality deteriorating location information 102 and it stores as the information about the quality deterioration location, date and time of receiving the information, location information, indoor or outdoor, radio wave condition, and contents of quality deterioration. Here, storage form of location information shall be not only in latitude/longitude but also any information which can specify the location such as a horizontal orthogonal (XY) coordinate system, address, and so on. Radio wave condition is the information which is showing the condition of radio wave at the location and can be displayed using such symbols shown on the display of a mobile phone as "out of service", and number of antennas (1, 2, 3). That is, the stored information of radio wave condition does not always have to be quantitative numerical information to indicate the radio wave quality at the location (such as Received Signal Code Power and received energy per chip divided by the power density in the band). And, the contents of quality deterioration is the information illustrating what kinds of quality deterioration occurred at the location, such as sending impossible, throughput deterioration, cut-out during conversation and one-way conversation. Further, while in this specification the case of mobile terminals is applied for explanation, other apparatuses than mobile terminals can be applied, which can check deterioration of communication quality or radio wave quality.

The margin calculating unit 103 acquires the radio wave quality estimation values at the quality deterioration location in the design target area by each quality deterioration location from the radio wave propagation estimating unit 101 and calculates a margin of radio wave quality estimation values in order to maintain a desired radio wave quality level, comparing the statistic value calculated from acquired radio wave quality estimation values with a prescribed radio wave quality threshold. Here, the quality deterioration locations in the design target area are acquired from the storage for quality deteriorating location information 102. For example, the range of the design target area is specified with a minimum value and a maximum value of latitude/longitude and the quality deteriorating locations inside of the range are read out from the storage for quality deteriorating location information 102 and are inputted to the radio wave propagation estimating unit 101.

A display controlling unit 104 receives the results of the radio wave propagation estimation from the radio wave propagation estimating unit 101 and shows them on display apparatuses such as a display not illustrated in the figures.

The area design directing unit 105 directs a layout of base stations and an adjustment of wireless parameters such as directions of antennas, tilt angles of antennas and antenna powers, a map information to be applied to the area and so on. It receives inputs through input devices such as a keyboard and a mouse, or files including the set-up information of the design target area and so on to give them to the radio wave propagation estimating unit 101.

Continued from the above mentioned, operations of the margin design apparatus 10 in the embodiment will be explained, referring to a flow chart of FIG. 3. Further, the explanation is on the assumption that a storage for quality deteriorating location information 102 has already stored information about quality deterioration.

At first, a layout of base stations and set-up values of wireless parameters around the design target area are inputted through an area design directing unit 105 (S1101).

Next, a radio wave propagation estimating unit 101 estimates a radio wave quality distribution in the design target area based on the inputted layout of base stations and set-up values of wireless parameters (S1102). As above mentioned, the estimating radio wave quality includes a Received Signal Code Power (RSCP) and a ratio of energy per chip of a desired wave to in-band received power density (Ec/NO) for each base station at an optional location in the target area and so on.

Next, a margin calculating unit 103 calculates a margin of radio wave quality estimation values in the design target area based on the information stored in the storage for quality deteriorating location information 102 and the radio wave quality distribution estimated by the radio wave propagation estimating unit 101 (S1103). Details of the margin calculation processing will be explained later with FIG. 4.

Next, the radio wave propagation estimating unit 101 revises the radio wave quality distribution in the design target area based on the margin calculated by the margin calculating unit 103 (S1104).

For example, a serviceable range of a base station included in the design target area is revised. Here, a serviceable range of a base station means the domain which is within an influence range of the base station and besides where the estimation value of the Received Signal Code Power is higher than a prescribed threshold (z). And an influence range of a base station is defined as a domain where the Received Signal Code Power from the base station is higher than the Received Signal Code Power from any other base stations. For example, the serviceable range before the revision is calculated as follows;

$$z = -110 \qquad \text{(Equation 1)}$$

And the serviceable range after the revision is calculated as follows;

$$z = -110 + \text{margin} \qquad \text{(Equation 2)}$$

Here, "margin" is the one calculated by the margin calculating unit 103.

Figure 6:
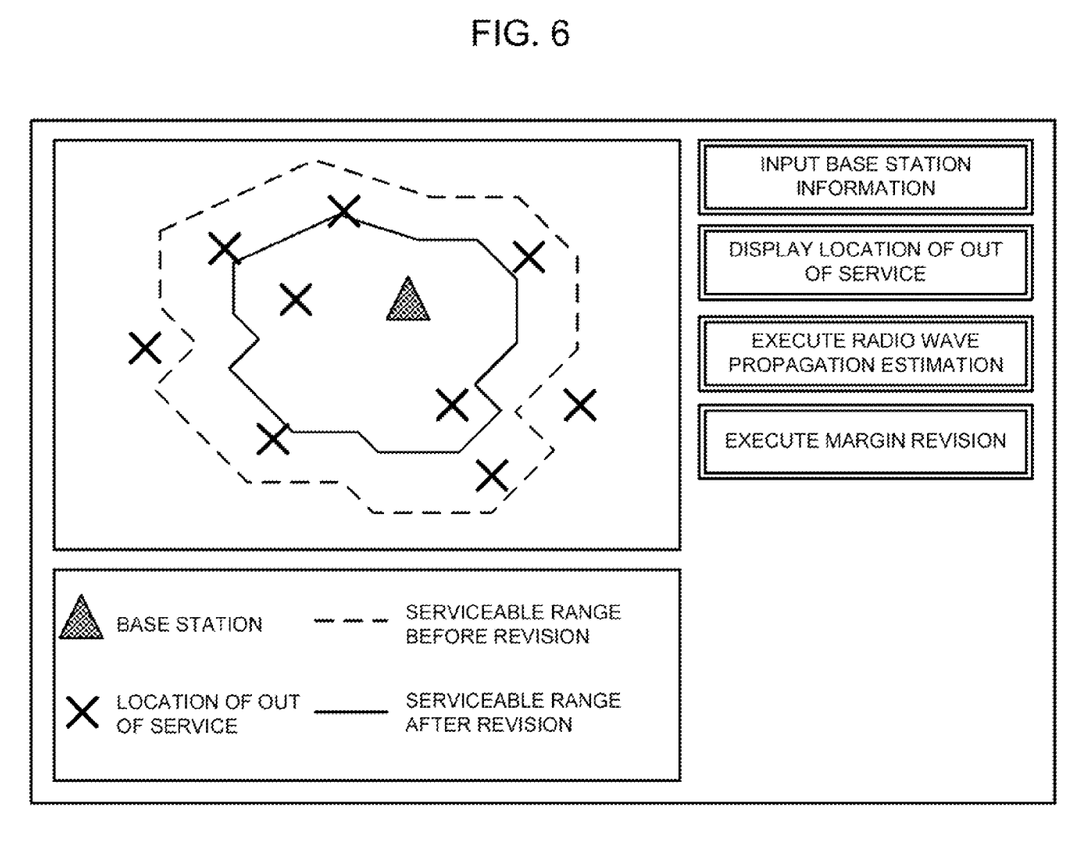
FIG. 6 is an explanation sketch illustrating an example of a monitor display by a display controlling unit.

FIG. 6 is an example to display the serviceable range revised as above mentioned, on a display screen by a display controlling unit 104. FIG. 6 shows the example which is displaying a base station, quality deterioration locations (out of service), a serviceable range before the revision based on the margin, and a serviceable range after the revision based on the margin. And as another example, it is possible to revise a radio wave quality distribution in the design target area to be lowered equally with the margin calculated through the margin calculating processing (S1103).

Next, the margin design processing is finished if an area covering rate of the revised radio wave quality distribution is higher than a prescribed value, but if not, the processing is continued and proceeds to the next step (S1105). For example, it can be applied as a judgment condition whether the area covering rate is higher than 95%, which is calculated with dividing the serviceable range space by the whole space of the design target area.

Next, in case that the condition is not satisfied in the former processing step (S1105), an area design is carried out (S1106). The area design which can be carried out by an area design directing unit 105 includes such as changing wireless parameters of a base station and installation of a new base station through the input devices such as a keyboard and a mouse, and files described with set-up information.

After completion of the area design, the radio wave propagation estimation is carried out again by the radio wave propagation estimating unit 101 (S1107) and the radio wave quality distribution after the completion of the area design is revised (S1104) based on the margin calculated through the margin calculating processing (S1103).

The processing mentioned above is repeated until the condition in S1105 is satisfied and the margin design processing is finished.

Figure 3:
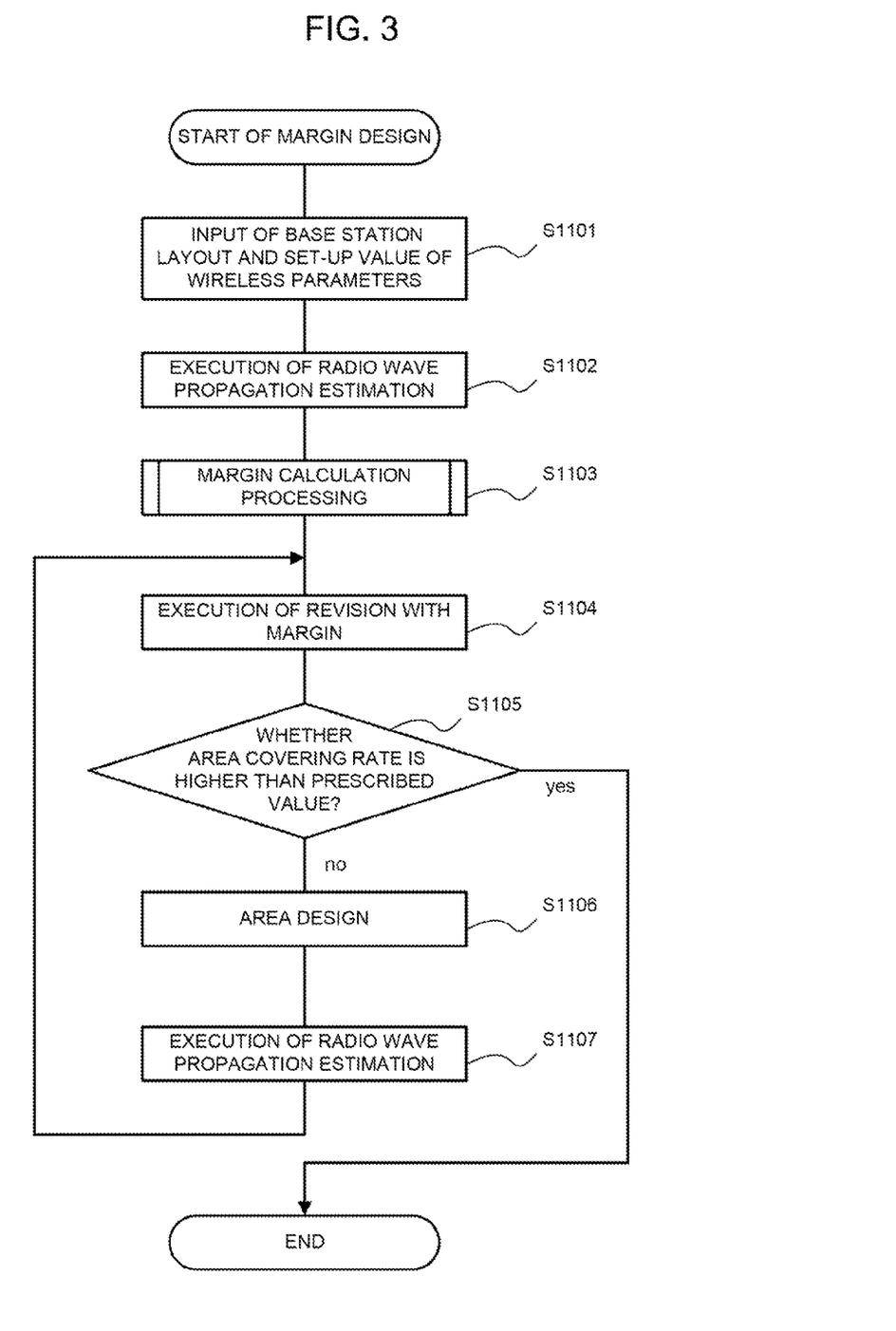
FIG. 3 is a flow chart illustrating an example of operations of a margin design apparatus in the first embodiment.
Figure 4:
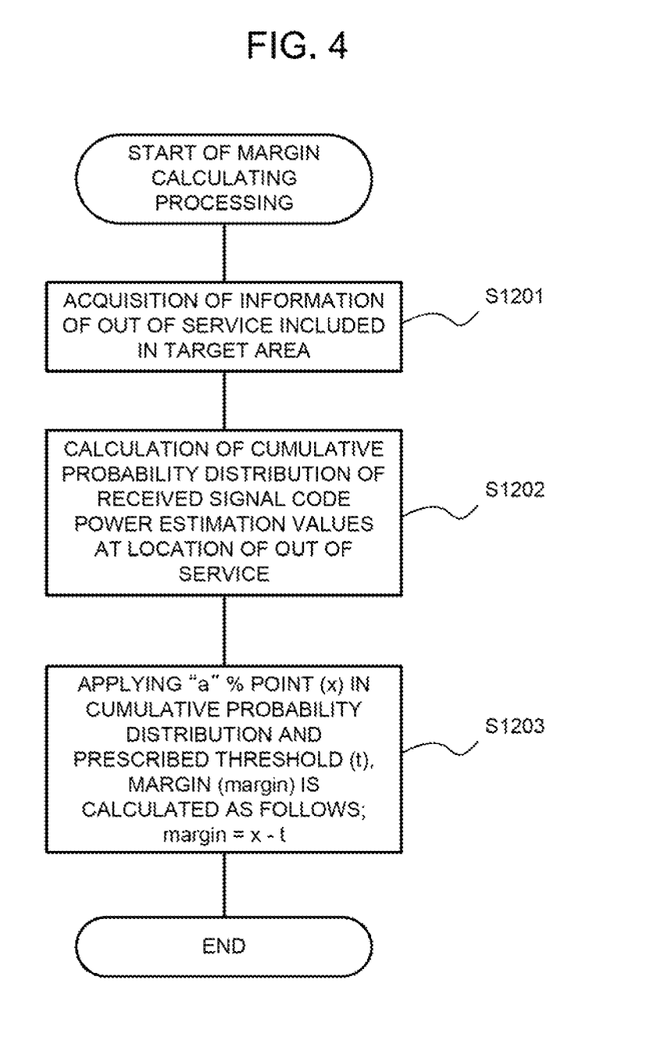
FIG. 4 is a flow chart illustrating an example of operations of a margin calculation unit in the first embodiment.

Next, details of the margin calculating processing (the margin calculating processing (S1103) in FIG. 3) which is carried out through the margin calculating unit 103 is explained with using FIG. 4.

First of all, at the margin calculating unit 103, information of out of service included in the design target area is acquired from the storage for quality deteriorating location information 102 (S1201). For example, as mentioned above, the range of the design target area is specified with a minimum value and a maximum value of latitude/longitude, and the information of out of service whose location shown in the location information is included in the specified range is acquired from the information of out of service stored in the storage for quality deteriorating location information 102. And as another example, the information of out of service included in the influence range of the design target base station may be acquired. Further, here explaining with a case of picking up a location of the out of service, however a location can be picked up according to the radio wave condition (out of service, antenna 1, and so on). And also, it can be picked up according to a combination of the radio wave condition and contents of quality deterioration (such as sending impossible, throughput deterioration, cut-out during conversation and one-way conversation).

Figure 5:
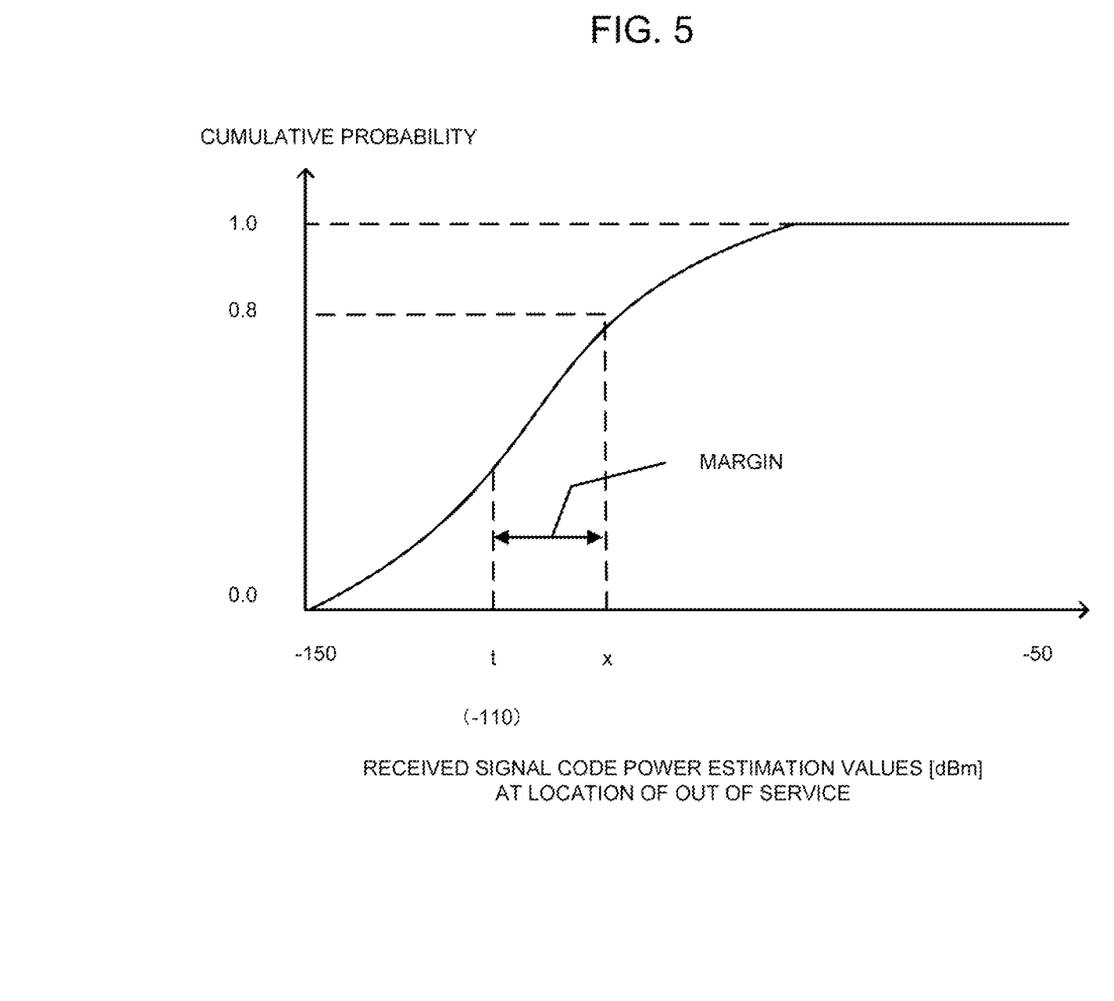
FIG. 5 is an explanation graph illustrating an example of a margin calculated by a margin calculating unit.

Next, estimation values of Received Signal Code Power (Received Signal Code Power estimation values) at the location indicated by the location information of the information of the out of service acquired from the storage for quality deteriorating location information 102 are acquired one by one from the radio wave propagation estimating unit 101 in order to calculate a cumulative probability distribution of the Received Signal Code Power estimation values (S1202). FIG. 5 is an explanation graph illustrating an example of a calculated cumulative probability distribution. As shown in FIG. 5, setting the Received Signal Code Power estimation values (unit is dBm) on the horizontal-axis and the cumulative probability on the vertical-axis, the cumulative probability distribution of the Received Signal Code Power estimation values at the location of out of service in the design target area is found out.

Next, a difference between a % point (x) in the above mentioned cumulative probability distribution and the prescribed threshold (t) is calculated and the difference is to be a margin of the Received Signal Code Power estimation value in the area (S1203). Here, such a Received Signal Code Power value as applied for the judgment for indicating the out of service of a mobile terminal is applied as a prescribed threshold (t). For example, assuming a=80, a Received Signal Code Power estimation value at 80% point in the cumulative probability distribution is x and a prescribed threshold (t) is −110 dBm, the margin " margin" can be calculated as follows;

$$\text{margin} = x - (-110) \qquad \text{(Equation 3)}$$

For example, in case that the Received Signal Code Power estimation value at 80% point in the cumulative probability distribution in FIG. 5 is assumed to be −85 dBm, the margin is 25 dBm. The more accurate the radio wave propagation estimation at the radio wave propagation estimating unit 101 is, the smaller the margin value is. The above mentioned constant "a" prescribes for the margin to be set how many percentages of locations of the out of service acquired from the storage for quality deteriorating location information 102 should be covered. That is to say, the larger the above mentioned constant "a" is, the larger the estimation of a margin will be. The margin calculated in this processing step is outputted to the radio wave propagation estimating unit 101 and gives a revision to the final displaying contents displayed by the display controlling unit 104.

After completing the above mentioned operation, the margin calculating processing is finished.

In this embodiment, a margin is calculated based on the cumulative probability distribution of the Received Signal, Code Power estimation values at locations of the out of service. Therefore, it is possible to calculate statistically a margin to be set in order to estimate correctly a certain percentage of the locations of the out of service through the radio wave propagation estimation.

Next, the second embodiment of the present invention is explained.

In the second embodiment of the present invention, while the basic configuration is as same as that of the first embodiment, an average value of the Received Signal Code Power estimation values can be applied instead of the above mentioned cumulative probability distribution when a margin is calculated through a margin calculating unit 103.

Figure 7:
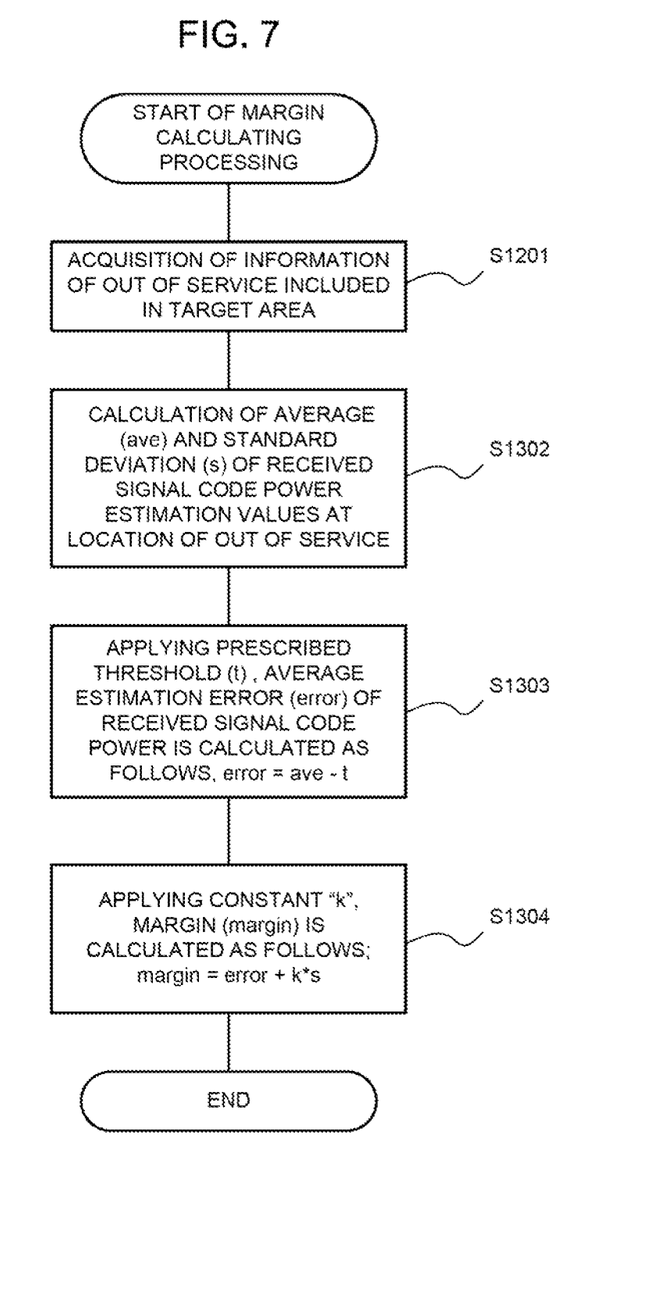
FIG. 7 is a flow chart illustrating an example of operations of a margin calculation unit in the second embodiment.

With FIG. 7, an example of the operation of a margin calculating processing in the embodiment will be explained.

First of all, the information of the out of service included in the design target area is acquired from a storage for quality deteriorating location information 102. This processing step is as same as S1201 in FIG. 4 in the first embodiment.

Next, estimation values of Received Signal Code Power at the locations indicated by the location information of the information of the out of service acquired from the storage for quality deteriorating location information 102 are acquired one by one from a radio wave propagation estimating unit 101 in order to calculate an average (ave) and a standard deviation (s) of the Received Signal Code Power estimation values (S1302). Further, in order to remove noises, for example, an average value (ave) and a standard deviation (s) can be calculated after omitting several samples of the highest value and the lowest value of the Received Signal Code Power estimation values. And a median or a mode can be applied instead of an average. And, comparing the Received Signal Code Power estimation values acquired from the radio wave propagation estimating unit 101 with a prescribed threshold (t) (for example, −110 dBm) as same as in the first embodiment, an average value (ave) and a standard deviation (s) can be calculated based on the Received Signal Code Power estimation values which are higher than the prescribed threshold (t).

Next, an average estimation error (error) of the Received Signal Code Power of the radio wave propagation estimating unit 101 is calculated (S1303) with comparing the average value (ave) of the Received Signal Code Power estimation values calculated in the former processing step (S1302) with the prescribed threshold (t). For example, assuming that a prescribed threshold (t) is −110 dBm as same as in the first embodiment, an average estimation error (error) is calculated shown as follows;

$$\text{error} = \text{ave} - (-110) \qquad \text{(Equation 4)}$$

Next, a margin of the Received Signal Code Power estimation value in the area is calculated (S1304) based on the above mentioned average estimation error (error). For example, a margin (margin) can be calculated with applying the above mentioned standard deviation (s) of the Received Signal Code Power estimation value and a constant (k) shown as follows;

$$\text{margin} = \text{error} + k*s \qquad \text{(Equation 5)}$$

Figure 8:
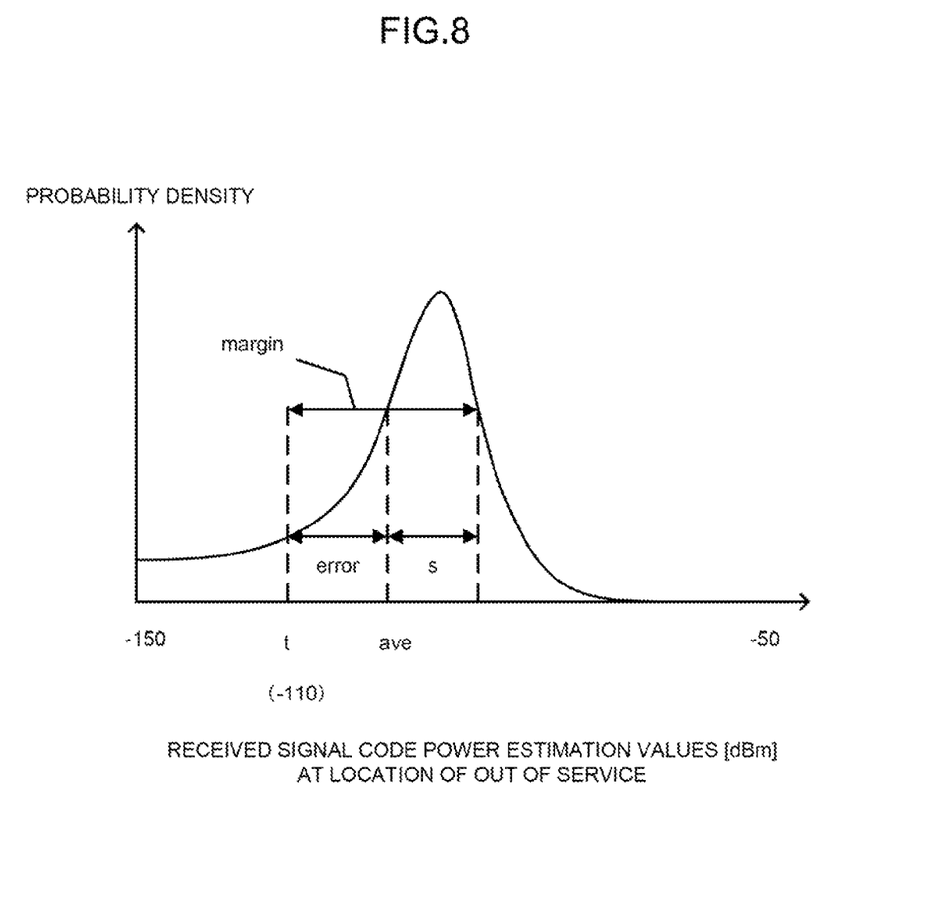
FIG. 8 is an explanation graph illustrating an example of a margin calculated by a margin calculating unit.

FIG. 8 is an explanation graph illustrating an example of a margin calculated in this embodiment. As shown in FIG. 8, setting the Received Signal Code Power estimation values (unit is dBm) on the horizontal-axis and the probability density on the vertical-axis, a margin is calculated with applying the average (ave), the standard deviation (s) and the prescribed threshold (t) (an example of k=1 is shown in FIG. 8).

After completing the above mentioned operation, the margin calculating processing is finished.

In this embodiment, the average estimation error of the Received Signal Code Power at the radio wave propagation estimating unit 101 can be handled clearly. Therefore, in case of calculating a margin, with limiting the information of out of service which is acquired from the storage for quality deteriorating location information 102 to the information of indoors sorted from indoor/outdoor category of the information of out of service, it can be applied to the use to estimate an average penetrating loss of buildings existing in the target area.

Next, the third embodiment of the present invention is explained.

In the third embodiment of the present invention, while the basic configuration is as same as that of the first embodiment, in case of a margin calculation, information of the out of service included in the outside of the design target area can be applied in addition to the information of the out of service included in the design target area as the information of the out of service acquired from a storage for quality deteriorating location information 102.

As an example, assuming a rectangular area which contains the design target area (that is to say, to include the areas adjoining the design target area), the information of the out of service included in the rectangular area can be applied. And as another example, the information of the out of service included in the area which belongs to the same category with the design target area can be applied. For example, classifying a base station installing location into such attributes as a city, a suburb and a country, based on such a land use classification data as provided by Geospatial Information Authority of Japan, the information of the out of service which is included in the influence range of the base stations, which belong to the same classification as the installation location of the design target base station can be applied. Attributes also can be added based on a population density distribution, a building distribution and so on in addition to the above mentioned land use classification data provided by Geospatial Information Authority of Japan.

In this embodiment, it is effective in increasing reliability of the calculated margin to increase the number of samples of the information of the out of service at the calculation of a margin, because a margin is calculated in each of the groups while areas where the accuracy of the radio wave propagation estimation is predicted to be almost the same are grouped in advance.

In the above mentioned embodiments of the present invention, it is just an example to apply a Received Signal Code Power as a radio wave quality to calculate a margin, and it is also naturally possible to apply a ratio of energy per chip of a desired wave to in-band received power density (Ec/NO) in a same way and a same configuration.

Further, the margin design apparatus shown in FIG. 1 can be configured not only with hardware as it is clear from the above explanation, but also it can be realized with computer programs.

The function and the operation as same as the above mentioned embodiments can be realized by a processor operated under programs stored in a program memory. Further, a part of the above mentioned embodiments also can be realized with computer programs.

As above mentioned, in the present invention, a margin in case of the area design with applying a radio wave propagation simulator is calculated with applying information of locations where the deterioration of communication quality or radio wave quality has been confirmed and the information of radio wave condition at the location. Therefore, it is not necessary to acquire information about areas where communication quality and radio wave quality are good in case of calculating a margin for radio wave propagation estimation. And the present invention makes it possible to calculate the margin statistically meeting the area and radio wave propagation estimation techniques. Especially in case that deterioration of communication quality or radio wave quality is checked by the mobile terminals allotted to users, including indoors of building and ordinary houses, it is possible to calculate a margin statistically meeting the area and radio wave propagation estimation techniques.

The present application claims the priority right based on Japanese Patent application No. 2008-074881 filed on Mar. 24, 2008 and the entire of the disclosure is incorporated here.

The invention claimed is:

1. A margin design apparatus, comprising:
   a storage for recording the information about locations where the deterioration of communication quality or radio wave quality has been confirmed in relation with the information about radio wave condition at the location;
   an estimating means for estimating a radio wave quality at the location which is picked up as the location which has the same radio wave condition from said storage wherein information relating to location where deterioration of communication quality or radio wave quality is confirmed, with a radio wave propagation simulator; and
   a margin calculating means for calculating a margin of radio wave quality estimation value based on said estimated radio wave quality and revising a radio wave quality distribution of the design target area based on the margin.

2. A margin design apparatus according to claim 1, wherein said margin calculating means calculates statistic values based on said estimated radio wave quality at the location which has the same information about the radio wave condition and calculate a margin of the radio wave quality estimation values comparing the statistic values with a prescribed threshold.

3. A margin design apparatus according to claim 2, wherein said statistic values are calculated from a cumulative probability distribution of said estimated radio wave quality.

4. A margin design apparatus according to claim 2, wherein said statistic value is one of an average, a median or a mode of said estimated radio wave quality.

5. A margin design apparatus according to claim 1, wherein said estimating means picks up said location which has the same information about the radio wave condition from an area which is included in at least one of the design target area, the area adjoining the design target area and the area whose geographic characteristics belongs to the same category as those of the design target area.

6. A margin design apparatus according to claim 1, wherein said estimating means picks up said location which has the same information about the radio wave condition from indoors or outdoors.

7. A margin design apparatus according to claim 1, wherein the radio wave quality estimated by said estimating means is a Received Signal Code Power (RSCP) or a ratio of energy per chip of a desired wave to in-band received power density (Ec/NO).

8. A margin design apparatus according to claim 1, wherein the location where said estimating means estimates the radio wave quality is the location where its radio wave condition is the out of service.

9. A margin design system, comprising:
a storage for recording information about locations where the deterioration of communication quality or radio wave quality was confirmed in relation with that about radio wave condition at the location;
an estimating means for estimating a radio wave quality at the location which is picked up as the location which has the same radio wave condition from said storage wherein information relating to location where deterioration of communication quality or radio wave quality is confirmed, with a radio wave propagation simulator; and
a margin calculating means for calculating a margin of radio wave quality estimation value based on said estimated radio wave quality and revising a radio wave quality distribution of a design target area based on the margin.

10. A margin design method, comprising:
an estimating step of estimating radio wave quality at the location which is picked up as the location which has the same radio wave condition from a storage wherein information relating to location where deterioration of communication quality or radio wave quality is confirmed and information relating to the radio wave condition at said location are associated with each other, with a radio wave propagation simulator; and
a margin calculating step of calculating a margin of radio wave quality estimation value based on said estimated radio wave quality.

11. A margin design method according to claim 10, wherein said margin calculating step comprises calculating statistic values based on said estimated radio wave quality at the location which has the same information about the radio wave condition, and calculating a margin of the radio wave quality estimation values comparing the statistic values with a prescribed threshold.

12. A margin design method according to claim 11, wherein said margin calculating step comprises calculating statistic values from a cumulative probability distribution of said estimated radio wave quality at the location which has the same information about the radio wave condition.

13. A margin design method according to claim 11, wherein said margin calculating step comprises calculating an average, a median or a mode as a statistic value of said estimated radio wave quality at the location which has the same information about the radio wave condition.

14. A margin design method according to claim 10, wherein said estimating step comprises picking up said location which has the same information about the radio wave condition, from an area which is included in at least one of the design target area, the area adjoining the design target area and the area whose geographic characteristics belongs to the same category as those of the design target area.

15. A margin design method according to claim 10, wherein said estimating step comprises picking up said location which has the same information about the radio wave condition from indoors or outdoors.

16. A margin design method according to claim 10, wherein the radio wave quality estimated in said estimating step is a Received Signal Code Power (RSCP) or a ratio of energy per chip of a desired wave to in-band received power density (Ec/NO).

17. A margin design method according to claim 10, wherein the location whose radio wave quality is estimated in said estimating step is the location where its radio wave condition is the out of service.

18. A non-transitory computer readable storage medium storing program for a margin design apparatus, said program makes said margin design apparatus execute:
an estimating processing of estimating radio wave quality at the location which is picked up as the location which has the same radio wave condition from a storage wherein information relating to location where deterioration of communication quality or radio wave quality is confirmed and information relating to the radio wave condition at said location are associated with each other, with a radio wave propagation simulator; and
a margin calculating processing of calculating a margin of radio wave quality estimation value based on said estimated radio wave quality.

* * * * *